Figure 1:
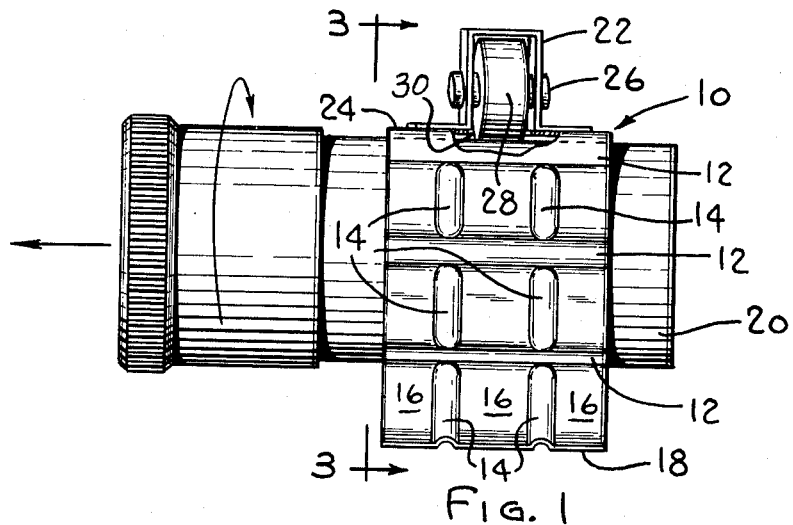

May 20, 1958 — J. W. PARMLEY — 2,835,164
FOCUSING LENS MOUNT
Filed July 18, 1955

INVENTOR.
JOHN W. PARMLEY
BY
John W. Michael
ATTORNEY

United States Patent Office 2,835,164
Patented May 20, 1958

2,835,164
FOCUSING LENS MOUNT

John W. Parmley, Oconomowoc, Wis., assignor to La Belle Industries, Inc., Oconomowoc, Wis., a corporation of Wisconsin Application July 18, 1955, Serial No. 522,582

2 Claims. (Cl. 88—24)

This invention relates to a focusing lens mount particularly useful in connection with slide projectors and the like and having provision for linear travel of the lens mount for purposes of rough or approximate focusing and helical focusing of the amount for close or accurate focusing.

The more costly slide projectors presently available employ a lens focusing system in which a knob or the like is turned to impart a linear movement to the lens mount. The system is simple and accurate and hence can be used for both the rapid, rough or approximate focusing and the final or precise focusing. The competitive conditions in this field preclude the use of this structure in the lower priced projectors since the cost is too great. Accordingly, the lower priced projectors have largely adopted a lens mounting system wherein the lens barrel is provided with a helical groove in which a spring loaded ball rides. Thus, as the lens mount is turned, the ball riding in the groove forces the mount to travel in or out of the projector body for focusing purposes. This motion is principally useful in the accurate stage of focusing. Therefore, when it is desired to focus rapidly or approximately, the lens barrel is grasped firmly and moved forward or rearwardly with the spring loaded ball riding over the tops of the grooves in the lens barrel.

The present lens mounting system can be produced at lower cost than the ball and groove structure. In addition to reducing cost, the mount provides a superior lens support since these is substantially no play or movement of the barrel with respect to the optical axis. Another advantage is that during the linear portion of the focusing operation, there is no noise as compared to the clinking sound encountered in the ball type mount when the ball rides over the grooves.

The principal object of this invention is to provide a simple, low cost, high quality lens mount which permits focusing either by linear movement of the lens barrel or by rotational movement to obtain a helical action.

Figure 2:
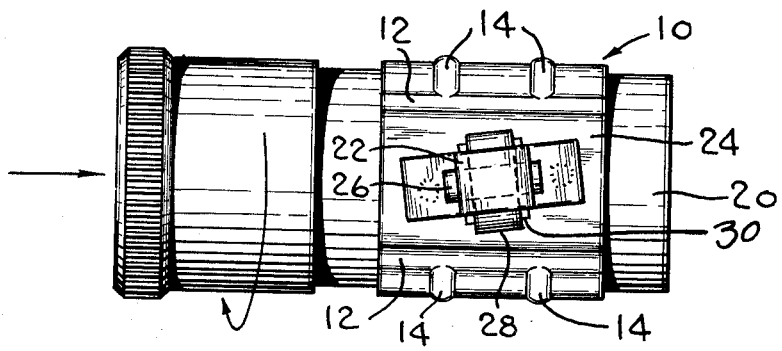
Figure 3:
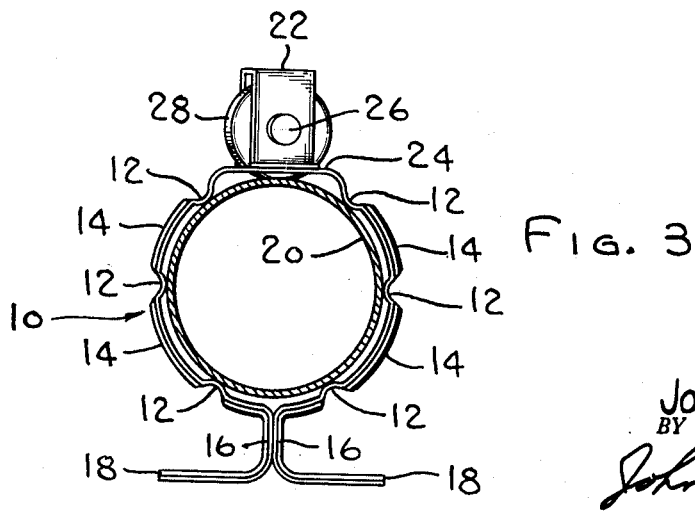

Other objects and advantages will be pointed out in, or be apparent from, the specification and claims, as will obvious modifications of the single embodiment shown in the drawings in which:

Fig. 1 is a side elevation of the lens mounting;
Fig. 2 is a top plan view of the mounting; and
Fig. 3 is a section taken as indicated by line 3—3 on Fig. 1.

The drawings show a lens holder 10 which is fabricated from a single piece of sheet metal by the stamping process to make the longitudinal ribs 12 and the generally circumferential ribs 14. The holder includes the leg portions which may be spot welded in the areas indicated by reference numeral 16. The feet 18 are employed in mounting the holder to the projector chassis. The inside surfaces of the longitudinal ribs 12 are adapted to snugly contact the exterior surface of lens barrel 20 and since the ribs 12 have appreciable length, the barrel has no play in the holder and will stay aligned with the optical axis.

Bracket 22 is spot welded to the top flat portion 24 of the holder so axle 26 for the resilient wheel 28 is transverse the optical axis or the axis of barrel 20. The resilient wheel projects through a cooperating aperture 30 in the holder to bear again the barrel 20. Since the wheel has a substantial contact area with the barrel and since the wheel rotates on an axis set at an angle with respect to the axis of the barrel, rotation of the barrel will act to move the barrel forwardly or rearwardly with respect to the holder in accordance with the effective pitch of the system. The effective number of threads per inch is, of course, determined by the angle between the wheel axis and the axis of the barrel. The smaller the angle, the greater the number of effective threads to the inch.

The resilient wheel is mounted so that it has sufficient bearing on the lens barrel to insure obtaining the helical focusing action when the lens barrel is turned. The frictional engagement between the wheel and the barrel is not sufficient, however, to prevent direct linear motion of the barrel. To accomplish this the barrel is firmly moved forwardly or rearwardly without any turning action. For appoximate focusing, therefore, the lens barrel can be moved rapidly with a linear motion while the accurate focusing is accomplished by turning the lens barrel. Fig. 1 shows how the lens barrel is moved forward by imparting a counterclockwise motion to the barrel when the barrel is viewed from the left of Fig. 1. In Fig. 2 the reverse situation is illustrated by means of the arrows on the drawing.

The present lens mounting system has all of the advantages of the spring loaded ball type plus the added advantage of no noise when the lens barrel is moved with a linear action only and the further advantage of superior support for the lens barrel so the barrel remains on the optical axis at all times.

Although but one embodiment of the present invention has been illustrated and described, it will be apparent to those skilled in the art that various changes and modifications may be made therein without departing from the spirit of the invention or from the scope of the appended claims.

I claim:
1. A focusing lens mount comprising, a tubular holder, a lens barrel mounted within the holder, an aperture within the wall of the holder, a wheel, an axle for the wheel set at an angle to the axis of the lens barrel, a bracket fixed on the holder and supporting the axle transversely of the axis of the barrel with the wheel extending through the aperture in the holder and bearing against the barrel through the aperture in the holder, said wheel being resilient and bearing against the barrel to impart a forward and rearward movement to the farrel as the barrel is turned within the holder and permitting non-rotatable linear movement of the barrel with respect to the holder.

2. A focusing lens mount comprising, a tubular holder, a lens barrel mounted within the holder, a wheel rotatably mounted on said holder and bearing against the barrel, the plane of said wheel lying at an angle to the axis of the lens barrel and the axis of said wheel extending transversely of the axis of said lens barrel, said wheel being resilient and bearing against the barrel to impart a forward and rearward movement to the barrel as the barrel is turned within the holder and permitting nonrotatable linear movement of the barrel with respect to the holder.

References Cited in the file of this patent

UNITED STATES PATENTS

| 465,409 | Knipe | Dec. 15, 1891 |
| 696,788 | Allen | Apr. 1, 1902 |
| 929,776 | Mills | Aug. 3, 1909 |
| 1,127,449 | Kandler | Feb. 9, 1915 |
| 1,649,646 | Badgley | Nov. 15, 1927 |
| 2,377,718 | Ress | June 5, 1945 |
| 2,428,719 | Nemeth | Oct. 7, 1947 |
| 2,439,485 | Porter | Apr. 13, 1948 |